US006736887B1

(12) United States Patent
Tsutsumi et al.

(10) Patent No.: US 6,736,887 B1
(45) Date of Patent: May 18, 2004

(54) WATER-BASED INK WITH POLYOXYALKYLENE OXIDE DERIVATIVES

(75) Inventors: Takehiro Tsutsumi, Wakayama (JP); Ryuma Mizushima, Wakayama (JP)

(73) Assignee: Kao Corporation, Tokyo (JP)

( * ) Notice: Subject to any disclaimer, the term of this patent is extended or adjusted under 35 U.S.C. 154(b) by 117 days.

(21) Appl. No.: 09/650,083

(22) Filed: Aug. 29, 2000

(30) Foreign Application Priority Data

Aug. 30, 1999 (JP) .......................................... 11-243135

(51) Int. Cl.[7] .......................... C09D 11/00; C09D 11/10
(52) U.S. Cl. ................ 106/31.25; 106/31.6; 106/31.65; 106/31.86; 106/31.89; 106/39; 524/376; 524/377; 524/378
(58) Field of Search ............................ 106/31.25, 31.6, 106/31.65, 31.86, 31.89, 39; 524/376, 377, 378

(56) References Cited

U.S. PATENT DOCUMENTS

| 4,229,219 A | | 10/1980 | Metz |
| 5,151,128 A | | 9/1992 | Fukushima et al. |
| 5,514,207 A | * | 5/1996 | Fague ...................... 106/20 R |
| 5,631,309 A | | 5/1997 | Yanagi et al. |
| 5,656,071 A | * | 8/1997 | Kapple et al. ........... 106/31.76 |
| 5,702,510 A | | 12/1997 | Yoshida et al. |
| 5,736,606 A | | 4/1998 | Yanagi et al. |
| 5,852,074 A | | 12/1998 | Tsutsumi et al. |
| 5,877,235 A | | 3/1999 | Sakuma et al. |
| 5,998,501 A | | 12/1999 | Tsutsumi et al. |
| 6,031,019 A | | 2/2000 | Tsutsumi et al. |

FOREIGN PATENT DOCUMENTS

| JP | 56-32566 | | 4/1981 | |
| JP | 60-32866 | | 2/1985 | |
| JP | 62-11781 | | 1/1987 | |
| JP | 62-121776 | | 6/1987 | |
| JP | 62-127373 | | 6/1987 | |
| JP | 62-243666 | | 10/1987 | |
| JP | 1-230685 | | 9/1989 | |
| JP | 01230685 | * | 9/1989 | .............. 106/31.58 |
| JP | 3-41171 | | 2/1991 | |
| JP | 4-211467 | | 8/1992 | |
| JP | 4-239067 | | 8/1992 | |
| JP | 5-5072 | | 1/1993 | |
| JP | 5-140496 | | 6/1993 | |
| JP | 6-157955 | | 6/1994 | |
| JP | 06184487 | * | 7/1994 | .............. 106/31.89 |

* cited by examiner

Primary Examiner—Kelechi C. Egwim
(74) Attorney, Agent, or Firm—Oblon, Spivak, McClelland, Maier & Neustadt, P.C.

(57) ABSTRACT

A water-based ink comprising an aqueous dispersion of fine polymer particles containing a colorant, and a polyalkylene oxide derivative. The water-based ink is less likely to cause nozzle clogging, thereby imparting high print quality.

12 Claims, No Drawings

WATER-BASED INK WITH POLYOXYALKYLENE OXIDE DERIVATIVES

BACKGROUND OF THE INVENTION

1. Field of the Invention

The present invention relates to a water-based ink. More specifically, the present invention relates to a water-based ink which is less likely to cause nozzle clogging, thereby imparting high print quality.

2. Discussion of the Related Art

In general, when characters are written with an ink on paper or printed with a printer, high quality is required for the characters.

Causation for lowering the print character quality includes feathering which is caused by spreading the ink along with fibers constituting paper, blotting, lowering of the drop directionality in an inkjet recording process, and the like.

For the purposes of reducing feathering and blotting, there has been proposed a water-based ink containing an alkylene oxide adduct having a relatively high molecular weight. However, there is a defect in the water-based ink such that the drop directionality is poor, thereby leading to a defect of lowered print character quality. The accuracy for expelling an ink droplet to a desired portion means that fine ink droplets are accurately expelled from a nozzle to a desired portion, that is, the surface of a recording medium.

In general, since an ink for inkjet recording is poor in water resistance and scratch and rub resistance, there has been proposed to use an aqueous dispersion of fine polymer particles containing a colorant to improve these properties. However, since the aqueous dispersion of fine polymer particles containing a colorant has film-forming property upon drying, there arise some defects such that dried substances are generated on the periphery of the nozzles, whereby the drop directionality is lowered.

In addition, in order to improve the drop directionality in generally used water-based ink as well as the water-based ink comprising an aqueous dispersion mentioned above, there have been proposed a water-based ink containing a surfactant having a long alkyl chain and a large number of moles of an alkylene oxide added, and showing a specific cloud point, such as polyethylene glycol lauryl ether (Japanese Patent Laid-Open No. Sho 60-32866); a water-based ink comprising a surfactant having a specific HLB value, such as polyoxyethylene nonylphenyl ether (Japanese Patent Laid-Open No. Hei 4-239067), and the like. Also, there has been proposed a water-based ink containing an additive such as polyalkylene oxide alkyl ether having a short alkyl chain and a small number of moles of an alkylene oxide added (Japanese Patent Laid-Open No. Sho 56-32566).

However, there are some defects in these water-based inks comprising an aqueous dispersion of fine polymer particles containing a colorant, such that the ink is spread along the fibers constituting paper to cause feathering or blotting when the surfactant or the additive is contained in an amount necessary for improving the drop directionality, so that print character quality is lowered, and print density is lowered, since surface tension of the ink is lowered.

An object of the present invention is to provide a water-based ink which is excellent in print density and print durability, has high print character quality, and is excellent in dry resistance and makes a water-fast print.

Another object of the present invention is to provide a water-based ink for inkjet recording which has excellent jetting stability and drop directionality.

These and other objects of the present invention will be apparent from the following description.

SUMMARY OF THE INVENTION

The present invention is directed to a water-based ink comprising an aqueous dispersion of fine polymer particles containing a colorant, and at least one polyalkylene oxide derivative selected from the group consisting of the compounds represented by the following formulae:

$$R^1O\text{—}(CH_2CH_2O)_a\text{—}H \qquad (I)$$

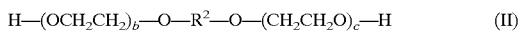
$$H\text{—}(OCH_2CH_2)_b\text{—}O\text{—}R^2\text{—}O\text{—}(CH_2CH_2O)_c\text{—}H \qquad (II)$$

$$R^3O\text{—}(CH_2CH_2O)_d\text{—}(CH_2CH(CH_3)O)_e\text{—}H \qquad (III)$$

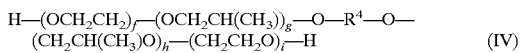
$$H\text{—}(OCH_2CH_2)_f\text{—}(OCH_2CH(CH_3))_g\text{—}O\text{—}R^4\text{—}O\text{—}$$
$$(CH_2CH(CH_3)O)_h\text{—}(CH_2CH_2O)_i\text{—}H \qquad (IV)$$

wherein each of a and d is independently a number of 10 to 40; each of b and c is independently a number of 5 to 20; e is a number of 1 to 3; f is a number of 5 to 20; each of g and h is independently a number of 0 to 4, wherein g+h is a number satisfying 1 to 4; i is a number of 5 to 20; each of $R^1$ and $R^3$ is independently a monovalent aliphatic group having 2 to 6 carbon atoms, a monovalent alicyclic group having 3 to 6 carbon atoms, or a monovalent aromatic group having 6 to 12 carbon atoms; $R^2$ is a divalent aliphatic group having 3 to 6 carbon atoms, a divalent alicyclic group having 3 to 6 carbon atoms, or a divalent aromatic group having 6 to 12 carbon atoms; $R^4$ is a divalent aliphatic group having 2 to 6 carbon atoms, a divalent alicyclic group having 3 to 6 carbon atoms, or a divalent aromatic group having 6 to 12 carbon atoms; and the oxyethylene chain and the oxypropylene chain in the formulae (III) and (IV) may be added in random or block forms.

DETAILED DESCRIPTION OF THE INVENTION

Preferable aqueous dispersions of fine polymer particles containing a colorant include an aqueous dispersion of fine polymer particles containing a hydrophobic dye and an aqueous dispersion of fine polymer particles containing a pigment. Among them, the aqueous dispersion of fine polymer particles containing a pigment, especially an organic pigment or carbon black, is more preferable.

The polymer used in the aqueous dispersion of fine polymer particles containing a hydrophobic dye or pigment includes vinyl polymers, polyesters, polyurethanes, and the like. Among the polymers, the vinyl polymers are preferable.

A preferable vinyl polymer includes a polymer prepared by copolymerizing a monomer composition comprising (a) at least one vinyl monomer selected from the group consisting of acrylic acid esters, methacrylic acid esters and styrenic monomers; (b) a polymerizable unsaturated monomer having a salt-forming group; and (c) a monomer copolymerizable with the vinyl monomer and the polymerizable unsaturated monomer having a salt-forming group.

The vinyl monomer includes acrylic acid esters such as methyl acrylate, ethyl acrylate, isopropyl acrylate, n-butyl acrylate, t-butyl acrylate, isobutyl acrylate, n-amyl acrylate, n-hexyl acrylate, n-octyl acrylate and dodecyl acrylate; methacrylic acid esters such as methyl methacrylate, isopropyl methacrylate, n-butyl methacrylate, t-butyl methacrylate, isobutyl methacrylate, n-amyl methacrylate, 2-ethylhexyl methacrylate, and lauryl methacrylate; and styrenic monomers such as styrene, vinyltoluene and 2-methylstyrene.

The unsaturated monomer having a salt-forming group includes cationic monomers having a salt-forming group and anionic monomers having a salt-forming group.

The cationic monomers having a salt-forming group include unsaturated tertiary amine-containing monomers, unsaturated ammonium salt-containing monomers, and the like. Among them, preferable examples include N,N-diethylaminoethyl acrylate, N-(N',N'-dimethylaminoethyl) acrylamide, vinylpyridine, 2-methyl-5-vinylpyridine, dimethylaminoethyl methacrylate, diethylaminoethyl methacrylate, and the like.

The anionic monomers having a salt-forming group include unsaturated carboxylic acid monomers, unsaturated sulfonic acid monomers, unsaturated phosphoric acid monomers, and the like. Among them, preferable examples include acrylic acid, methacrylic acid, itaconic acid, maleic acid, fumaric acid, and the like.

The monomer copolymerizable with the vinyl monomer and the polymerizable unsaturated monomer having a salt-forming group includes acrylamide monomers; methacrylamide monomers; hydroxyl group-containing monomers; macromers having a polymerizable functional group at one end such as silicone macromers, styrenic macromers, polyester macromers, polyurethane macromers, and poly(alkyl ether) macromers; and especially a macromer represented by the formula (V):

$$CH_2=C(R^5)COO(R^6O)_pR^7 \qquad (V)$$

wherein $R^5$ is hydrogen atom or a lower alkyl group; $R^6$ is a divalent hydrocarbon group having 1 to 30 carbon atoms which may have a hetero-atom; $R^7$ is hydrogen atom or a monovalent hydrocarbon group having 1 to 30 carbon atoms which may have a hetero-atom; and p is a number of 1 to 60; and the like. These monomers can be used alone or in admixture of at least two kinds. These monomers are given by way of exemplification, without intending to limit the present invention to those exemplified ones.

Preferable hydroxyl group-containing monomers are 2-hydroxyethyl acrylate and 2-hydroxyethyl methacrylate.

Preferable macromers represented by the formula (V) are polyethylene glycol(2 to 30) (meth)acrylate and methoxypolyethylene glycol(1 to 30) (meth)acrylate. The term "(meth)acrylate" employed in the present specification means acrylate or methacrylate.

Among these copolymerizable monomers, macromers are preferable, and the silicone macromer, the styrenic macromer and the poly(alkyl ether) macromer are more preferable.

It is desired that the content of the vinyl monomer in the monomer composition is 1 to 75% by weight, preferably 5 to 60% by weight, more preferably 10 to 50% by weight, from the viewpoints of improvement in dispersion stability of the polymer emulsion and heat stability, that is, avoidance of scorching on the inkjet printer head.

It is desired that the content of the polymerizable unsaturated monomer having a salt-forming group in the monomer composition is 2 to 40% by weight, preferably 5 to 20% by weight, from the viewpoints of improvement in dispersion stability of the polymer emulsion and avoidance of scorching on the inkjet printer head.

It is desired that the content of the monomer copolymerizable with the vinyl monomer and the polymerizable unsaturated monomer having a salt-forming group in the monomer composition is 5 to 90% by weight, preferably 10 to 85% by weight, more preferably 20 to 60% by weight, from the viewpoints of improvement in dispersion stability of the polymer emulsion and avoidance of scorching on the inkjet printer head.

In addition, it is preferable that the average particle diameter of the fine polymer particles (the average particle diameter being determined in accordance with the method described in Preparation Examples given below) is 20 to 200 nm, from the viewpoint of dispersion stability.

It is preferable that the weight-average molecular weight of the polymer (the weight-average molecular weight being determined in accordance with the method described in Preparation Examples given below) is 3000 to 50000, from the viewpoints of scorching of a printer head, durability of ink after printing, and facilitation of the dispersion.

The hydrophobic dye can be used without limitation to specified ones, as long as the hydrophobic dye can be contained in the fine polymer particles. Examples of the hydrophobic dye include oil dyes, disperse dyes, basic dyes, and the like. Among them, the oil dyes and the disperse dyes are preferable from the viewpoint of favorably containing the dyes in the fine polymer particles.

The oil dyes are not limited to specified ones. Examples of the oil dyes include C.I. Solvent Black 3, 7, 27, 29, 34; C.I. Solvent Yellow 14, 16, 29, 56, 82; C.I. Solvent Red 1, 3, 8, 18, 24, 27, 43, 51, 72, 73; C.I. Solvent Violet 3; C.I. Solvent Blue 2, 11, 70; C.I. Solvent Green 3, 7; C.I. Solvent Orange 2, and the like.

The disperse dyes are not limited to specified ones. Preferred examples include C.I Disperse Yellow 5, 42, 54, 64, 79, 82, 83, 93, 99, 100, 119, 122, 124, 126, 160, 184:1, 186, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; C.I. Disperse Green 6:1, 9, and the like.

It is desired that the hydrophobic dye is dissolved in an organic solvent in a concentration of at least 2 g/L, preferably 20 to 500 g/L, from the viewpoint of efficiently encapsulating the hydrophobic dye into the fine polymer particles.

The aqueous dispersion of the fine polymer particles containing the hydrophobic dye can be prepared by known emulsification process. For instance, the aqueous dispersion can be obtained by dissolving a polymer and a hydrophobic dye in an organic solvent, adding a neutralizing agent as occasion demands to ionize a salt-forming group in the polymer, adding water to the resulting mixture, thereafter emulsifying with an emulsifier as occasion demands, and distilling off the organic solvent.

As the pigment, any kinds of known inorganic pigment or organic pigments can be used. Also, an extender can be used together with the pigment, as occasion demands. The inorganic pigment includes carbon black, metal oxides, metal sulfides, metal chlorides, and the like. Among them, carbon black is preferable for a black water-based ink. The carbon black includes furnace black, lamp black, acetylene black, channel black, and the like. The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments, and the like. The extender includes silica, calcium carbonate, talc, and the like.

As a process for preparing an aqueous dispersion of the fine polymer particles containing a pigment, it is preferable to employ a process comprising dissolving a polymer in an organic solvent; adding a pigment, water and a neutralizing agent, and a surfactant as occasion demands to the resulting solution; kneading the mixture to form a paste; thereafter diluting the resulting paste with water as occasion demands; and distilling off the organic solvent from the mixture to give an aqueous dispersion.

It is preferable that the amount of the hydrophobic dye or pigment in the fine polymer particles is 20 to 400 parts by weight, based on 100 parts by weight of solid content of the polymer, from the viewpoints of print density and facilitation of containing of the hydrophobic dye or pigment into the fine polymer particles. In addition, the content of the hydrophobic dye or pigment in the water-based ink is preferably 1 to 30% by weight, more preferably 3 to 15% by weight, from the viewpoints of print density and jetting stability.

The content of the fine polymer particles containing a colorant in the water-based ink is not limited to specified ones, as long as sufficient print density can be obtained. It is desired that the content of the fine polymer particles in the water-based ink is usually 2 to 35% by weight, preferably 4 to 20% by weight, more preferably 4 to 8% by weight, from the viewpoints imparting sufficient print density and dry resistance.

In the polyalkylene oxide derivatives represented by the formulae (I) to (IV), the compound represented by the formula (I) is preferable from the viewpoint of excelling in print durability, and the compound represented by the formula (II) is preferable from the viewpoint of excelling in dry resistance.

In the polyalkylene oxide derivatives represented by the formulae (II) and (IV), the oxyethylene chain (hereinafter abbreviated as "EO") and the oxypropylene chain (hereinafter abbreviated as "PO") may be added in random forms or in block forms. In addition, EO and/or PO may be added in divisions of at least two sites, or one of EO and PO may be arranged adjacently to $R^3$, $R^4$ or terminal hydrogen atom.

The polyalkylene oxide derivative represented by the formula (III) can be schematically represented by these abbreviations EO and PO. Its embodiments include $R^3O$—EO—PO—H, $R^3O$—PO—EO—H, $R^3O$—EO—PO—EO—H, $R^3O$—PO—EO—PO—H, $R^3O$—EO—PO—EO—PO—H, $R^3O$—EO—PO—EO—PO—EO—H, and the like. Among them, $R^3O$—EO—PO—EO—H is preferable. The PO may include —CH(CH$_3$)CH$_2$O— other than —CH$_2$CH(CH$_3$)O—. The same can be said for the polyalkylene oxide derivative represented by the formula (IV).

In the polyalkylene oxide derivative represented by the formula (IV), it is preferable that the sum of g and h, i.e. g+h, is 2 to 4.

Concrete examples of $R^1$ and $R^3$ include monovalent aliphatic groups having 2 to 6 carbon atoms, such as ethyl group, propyl group, isopropyl group, butyl group, isobutyl group, t-butyl group, hexyl group and isohexyl group; monovalent alicyclic groups having 3 to 6 carbon atoms, such as pyrrolidinyl group and cyclohexyl group; and monovalent aromatic groups having 6 to 12 carbon atoms, such as benzyl group and naphthyl group.

Concrete examples of $R^2$ include divalent aliphatic groups having 3 to 6 carbon atoms, such as propylene group, isopropylene group, butylene group, isobutylene group and hexylene group. Preference is given to divalent aliphatic groups having 4 to 6 carbon atoms; divalent alicyclic groups having 3 to 6 carbon atoms, such as cyclohexylene group; and divalent aromatic groups having 6 to 12 carbon atoms, such as benzylidene group and naphthylene group, from the viewpoint of optimization of surface active ability.

In addition, concrete examples of $R^4$ include divalent aliphatic groups having 2 to 6 carbon atoms, such as ethylene group, propylene group, isopropylene group, butylene group, isobutylene group and hexylene group. Preference is given to divalent aliphatic groups having 2 to 3 carbon atoms; divalent alicyclic groups having 3 to 6 carbon atoms, such as cyclohexylene group; and divalent aromatic groups having 6 to 12 carbon atoms, such as benzylidene group and naphthylene group, from the viewpoint of optimization of surface active ability.

The number-average molecular weight of the polyalkylene oxide derivative is preferably 500 to 2000, more preferably 700 to 1500, from the viewpoints of jetting stability, print quality and dry resistance.

The surface tension of the polyalkylene oxide derivative is preferably 50 mN/m or more at 25° C. from the viewpoints of imparting excellent jetting stability and print quality, more preferably 55 to 65 mN/m at 25° C. from the viewpoint of diminishing feathering and blotting of characters for a wide variety of recording media.

In addition, it is preferable that the surface tension of the polyalkylene oxide derivative is 50 to 62 mN/m at 25° C., and 40 to 55 mN/m at 80° C., from the viewpoint of improvement in drop directionality. Furthermore, in addition to the above conditions, it is more preferable that the difference between the surface tension of the polyalkylene oxide derivative at 25° C. and the surface tension of the polyalkylene oxide derivative at 80° C. is at least 5.5 mN/m.

The term "surface tension" employed in the present specification refers to a value determined by using its 5 w/v % aqueous solution (the surface tension being determined by the method mentioned in the item [Surface Tension] given below).

In the present invention, since the chain length of the alkyl group of the polyalkylene oxide derivative is short and the number of the alkylene oxide added is large, the surface active ability is low, so that feathering and blotting are less likely to be generated.

It is desired that the content of the polyalkylene oxide derivative in the water-based ink is 1 to 15% by weight, preferably 4 to 10% by weight, from the viewpoints of imparting sufficient dry resistance and print durability to the resulting water-based ink.

It is preferable that a water-soluble organic solvent is contained in the water-based ink of the present invention. When the water-soluble organic solvent is contained, there is an advantage that the water-based ink is excellent in dry resistance.

The water-soluble organic solvent may be any one as long as its solubility against water is at least 1% by weight at 25° C. Examples of the water-soluble organic solvent include polyhydric alcohols such as ethylene glycol, diethylene glycol, glycerol, propylene glycol, 1,3-butanediol, 1,4-butanediol, 1,5-pentanediol, trimethylolpropane and trimethylolethane; nitrogen-containing cyclic compounds such as 2-pyrrolidone, γ-butyrolactam, urea and ethyleneurea; nitrogen-containing acyclic compounds such as acetamide and N-monomethylacetamide. These water-soluble organic solvents can be used alone or in admixture of at least two kinds. Among them, diethylene glycol, glycerol and 2-pyrrolidone are preferable.

The content of the water-soluble organic solvent in the water-based ink is not limited to specified ones, and it is preferable that the content is usually 5 to 30% by weight or so, from the viewpoint of dry resistance.

The water-based ink of the present invention may further contain an additive such as a surfactant, a pH adjusting agent or antiseptics, as occasion demands, within a range so as not to impair the object of the present invention.

The water-based ink of the present invention further contains water as balance so that each ingredient is contained in a desired amount.

The water-based ink of the present invention can be readily prepared by mixing desired amounts of an aqueous dispersion of fine polymer particles containing a colorant, a polyalkylene oxide derivative, a water-soluble organic solvent and water, and an additive as occasion demands.

Since the water-based ink of the present invention is excellent in jetting stability and drop directionality, the water-based ink can be suitably used as a water-based ink for inkjet recording.

EXAMPLES

Production Examples 1 to 6 [Preparation of Polyalkylene Oxide Derivatives]

A 2000-L pressure reaction vessel was sufficiently replaced with nitrogen gas. Thereafter, the reaction vessel was charged with an alcohol shown in Table 1 and 0.84 g of potassium hydroxide, and the mixture was allowed to stand at 40° C. for 2 hours. Thereafter, the internal temperature was raised to 145° C., and each of alkylene oxides (1) to (3) shown in Table 1 was sequentially poured into the reaction vessel so that the internal pressure of the reaction vessel did not exceed 4.0 kg/cm$^2$·G. When each alkylene oxide was poured, each of them was poured and matured at 145° C. for 3 hours, and thereafter the subsequent alkylene oxide was poured.

After pouring the alkylene oxides, the mixture was further matured at 145° C. for 0.5 hours. Subsequently, the temperature was lowered to 120° C., and the pressure inside the reaction vessel was recovered to normal pressure. Thereafter, 6.7 g of an adsorbent (commercially available from Kyowa Chemical Industry Co., Ltd., under the trade name of "Kyowado 600S") was added to the reaction vessel, and the mixture was allowed to stand for 1 hour. Thereafter, the mixture was filtered, thereby giving each of the polyalkylene oxide derivatives (Compounds A to F) shown in Table 1.

The surface tension of the resulting polyalkylene oxide derivative was determined in accordance with the following method. The results are shown in Table 1.

[Surface Tension]

A sample was prepared by diluting a polyalkylene oxide derivative with ion-exchanged water to the concentration of 5 w/v %. The surface tension of the resulting sample was measured at 25° C. and 80° C. by Wilhelmy plate method using a surface tension balance (commercially available from Kyowa Interface Science Co., Ltd., under the trade name of "CBVP-Z").

TABLE 1

| Ex. No. | Alcohol (g) | Alkylene Oxide (g) | | | Polyalkylene Oxide Derivatives | | | | | |
|---|---|---|---|---|---|---|---|---|---|---|
| | | Alkylene Oxide (1) | Alkylene Oxide (2) | Alkylene Oxide (3) | Compound | Kinds | Number-Average Molecular Weight | Surface Tension (mN/m) | | |
| | | | | | | | | at 25° C. | at 80° C. | Difference |
| Production | | | | | | | | | | |
| 1 | n-Butanol (74) | Ethylene Oxide (925) | None | None | A | Formula (I) | 1000 | 56.7 | 50.8 | 5.9 |
| 2 | Propylene Glycol (76) | Ethylene Oxide (881) | None | None | B | Formula (II) | 980 | 60.6 | 54.9 | 5.7 |
| 3 | n-Butanol (74) | Ethylene Oxide (220) | Propylene Oxide (58) | Ethylene Oxide (661) | C | Formula (III) | 1010 | 54.7 | 49.8 | 4.9 |
| 4 | 1,3-Propanediol (76) | Propylene Oxide (116) | Ethylene Oxide (793) | None | D | Formula (IV) | 980 | 56.7 | 47.3 | 9.4 |
| 5 | n-Butanol (74) | Ethylene Oxide (661) | None | None | E | Formula (I) | 740 | 54.1 | 41.2 | 12.9 |
| 6 | n-Butanol (74) | Ethylene Oxide (1322) | None | None | F | Formula (I) | 1400 | 58.0 | 52.3 | 5.7 |
| Ref. | | | | | | | | | | |
| 1 | Ethylene Glycol | Ethylene Oxide (968) | None | None | PEG | Formula (II) | 1000 | 63.0 | 57.9 | 5.1 |
| 2 | Lauryl Alcohol | Ethylene Oxide (440) | None | None | EMG | Formula (I) | 630 | <50 | <40 | — |

(Note)
PEG: Polyethylene glycol; EMG: EMULGEN 120
Reference Example 1: One used in Comparative Example 1
Reference Example 2: One used in Comparative Example 2

Preparation Example 1 (Preparation of Aqueous Dispersion of Fine Polymer Particles Containing Carbon Black)

(1) Preparation of Polymer Solution

A 1-L flask equipped with a mechanical stirrer, a thermometer, a nitrogen gas inlet tube, a reflux condenser and a dropping funnel was sufficiently replaced with nitrogen gas. Thereafter, the flask was charged with 11.2 g of styrene, 2.8 g of acrylic acid, 12.0 g of lauryl methacrylate, 4.0 g of polyethylene glycol methacrylate, 4.0 g of a styrene macromer (commercially available from TOAGOSEI CO., LTD., under the trade name of "AS-6") and 0.4 g of mercaptoethanol, and the temperature was raised to 65° C.

Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (commercially available from TOAGOSEI CO., LTD., under the trade name of "AS-6"), 3.6 g of mercaptoethanol, 2.4 g of azobisdimethylvaleronitrile and 18 g of methyl ethyl ketone was added dropwise to the flask over a period of 2.5 hours.

After the termination of the dropwise addition, a mixed solution of 0.8 g of azobisdimethylvaleronitrile and 18 g of methyl ethyl ketone was added dropwise to the flask over a period of 0.5 hours. After the mixture was matured at 65° C. for 1 hour, 0.8 g of azobisdimethylvaleronitrile was added thereto, and the mixture was matured for additional one hour.

After the termination of the reaction, 364 g of methyl ethyl ketone was added to the flask, to give 800 g of a polymer solution, the concentration of which was 50% by weight.

A portion of the polymer solution was dried, and its weight-average molecular weight was determined by gel permeation chromatography (standard: polystyrene, solvent: tetrahydrofuran). As a result, the weight-average molecular weight was 15000.

(2) Preparation of Aqueous Dispersion of Fine Polymer Particles Containing Carbon Black Twenty-eight grams of the polymer solution obtained in item (1) above, 26 g of carbon black (commercially available from Cabot Corporation, under the trade name of "Monarch 880"), 13.6 g of a 1 mol/L aqueous potassium hydroxide, 20 g of methyl ethyl ketone and 30 g of ion-exchanged water were sufficiently stirred. Thereafter, the mixture was kneaded for 20 times using a triple roller mill (commercially available from NORITAKE CO., LIMITED, under the trade name of "NR-84A"), to give a paste.

The resulting paste was added to 200 g of ion-exchanged water, and the mixture was sufficiently stirred. Thereafter, methyl ethyl ketone and water were distilled off using an evaporator, to give 160 g of an aqueous dispersion of fine polymer particles containing carbon black, the solid content of which was 20.0% by weight. The average particle diameter was determined by using a COULTER N4 Plus (trade name, commercially available from Beckman Coulter, Inc.). As a result, the average particle diameter was 110 nm.

Preparation Example 2 (Preparation of Aqueous Dispersion of Fine Polymer Particles Containing Oil Dye)

The same procedures as in the above item (2) of Preparation Example 1 were carried out except that a copolymer composed of 50% by weight of n-butyl methacrylate, 10% by weight of 2-hydroxyethyl methacrylate, 35% by weight of dimethylaminoethylacrylamide, and 5% by weight of a silicone macromer (commercially available from CHISSO CORPORATION, under the trade name of "FM-0711"), and neutralized with gluconic acid was used as a polymer, that an oil dye (commercially available from Orient Chemical Co., Ltd., under the trade name of "Oil Black 860") was used in place of carbon black, and that Microfluidizer M-110 (commercially available from Microfluidics International Corporation) was used in place of the triple roller mill, to give an aqueous dispersion. In this preparation example, the aqueous dispersion was prepared in reference to Examples given in Japanese Patent Laid-Open No. Hei 10-279873.

Preparation Example 3 (Preparation of Aqueous Dispersion of Fine Polymer Particles Containing Organic Pigment)

The same procedures as in the above item (2) of Preparation Example 1 were carried out except that phthalocyanine pigment (commercially available from DAINIPPON INK & CHEMICALS, INC., under the trade name of "TGR-SD") was used in place of carbon black, to give an aqueous dispersion of fine polymer particles containing a blue organic pigment. The average particle diameter of the fine polymer particles was 82 nm.

Examples 1 to 6 and Comparative Examples 1 and 2 (Preparation of Water-Based Ink)

There were mixed 7.5 g of one of a compound shown in Table 1 as a polyalkylene oxide derivative obtained in each of Production Examples 1 to 6, polyethylene glycol 1000 (ethylene oxide adduct of ethylene glycol, number-average molecular weight: 1000) and polyethylene glycol lauryl ether (moles of ethylene oxide added: 10; commercially available from Kao Corporation, under the trade name of "EMULGEN 120"), 10 g of 2-pyrrolidone, 2.5 g of glycerol, 1 g of isopropanol and 14 g of ion-exchanged water. Thereafter, 15 g of the aqueous dispersion of the fine polymer particles containing carbon black obtained in Preparation Example 1 was added to the resulting liquid mixture with stirring. The resulting mixture was filtered with a membrane filter (commercially available from Fuji Photo Film Co., Ltd., under the trade name of "Disc Capsule CALC80") having an average pore diameter of 0.8 μm, to give a water-based ink.

Example 7

The same procedures as in Example 2 were carried out except for using 7 g of ion-exchanged water and 23 g of the aqueous dispersion of fine polymer particles containing an oily dye, obtained in Preparation Example 2 in place of 14 g of ion-exchanged water and 15 g of the aqueous dispersion of fine polymer particles containing carbon black, to give a water-based ink.

Example 8

The same procedures as in Example 2 were carried out except for using an aqueous dispersion of fine polymer particles containing an organic pigment obtained in Preparation Example 3 in place of the aqueous dispersion of fine polymer particles containing carbon black, to give a water-based ink.

Next, as the physical properties of the water-based inks obtained in each of Examples and Comparative Examples, print density, print durability, print character quality and dry resistance were evaluated in accordance with the following methods. The results are shown in Table 2.

[Print Density]

An inkjet printer (commercially available from Hewlett Packard Co., under the trade name of "Desk Jet 720C") was filled with an ink, and thereafter printing was carried out on plain paper (commercially available from Xerox Corporation, under the trade name of "Xerox® 4024 DP 201b. Paper"). The printed matter was dried at 25° C. for 3 hours, and thereafter the print density was determined by using a Macbeth densitometer (commercially available from Macbeth Process Measurements Co., under the trade name of "RD918").

[Print Durability]

Continuous printing was carried out using the same printer and plain paper used in the evaluation of Print Density as above, to give 10 solid image-printed A4 sheets. Thereafter, a test document including characters, solid images and ruled lines was printed, to evaluate print durability. The evaluation criteria are as follows:

(Evaluation Criteria)

⊚: Satisfactory in all of three items of sharp and clear characters, uniform solid images, and no crookedness of printed ruled lines ○: Almost satisfactory in three items of sharp and clear characters, uniform solid images, and no crookedness of printed ruled lines Δ: Unsatisfactory in one of three items of sharp and clear characters, uniform solid images, and no crookedness of printed ruled lines X: Unsatisfactory in at least two items of three items of sharp and clear characters, uniform solid images, and no crookedness of printed ruled lines

[Character Quality]

1) Blotting etc.

Among the quality of the printed characters obtained by carrying out text printing by using the same printer and plain paper used in the evaluation of Print Density as above, blotting and feathering were evaluated in accordance with the following evaluation criteria:

(Evaluation Criteria)

○: Blotting of characters and feathering generated along paper fibers are not observed at all.

Δ: Either blotting of characters or feathering generated along paper fibers is observed.

X: Both blotting of characters and feathering generated along paper fibers are observed.

2) Drop Directionality

Ruled line printing was carried out using the same printer and plain paper used in the evaluation of Print Density, and the drop directionality was evaluated in accordance with the following evaluation criteria:

(Evaluation Criteria)

○: Ruled lines are straight, and no crookedness is observed.

Δ: Ruled lines are not straight, and slight crookedness is observed.

X: Ruled lines are not straight, and marked crookedness is observed.

[Dry Resistance]

The printer cartridge used in the evaluation of Print Density as above was allowed to stand at 25° C. without capping. After 3 days passed, the text document was printed again using the printer cartridge, and dry resistance was evaluated on the basis of the following evaluation criteria:

(Evaluation Criteria)

⊚: Printing can be carried out from the initial character being printed without any change from that before the above test.

○: Printing can be carried out from the initial character being printed without almost any change from that before the above test.

Δ: Slight blur is observed at the initial character being printed but diminished in progress of printing.

X: Blur of characters is not diminished at all.

[Water Resistance]

Solid image printing was carried out on commercially available copy paper with a bubble jet printer (commercially available from Hewlett Packard Co., under the trade name of "Desk Jet-720C"), and dried at 25° C. for 1 hour. The print density of the specified printed portion of the obtained sample was determined, and thereafter the printed copy paper was immersed in stand-still water for 10 seconds, and the paper was lifted vertically therefrom.

After air-drying the paper at 25° C. for 24 hours, the print density of the same printing portion as that before immersion was measured, and the residual ratio was determined by the following equation:

$$[\text{Residual Ratio}] = \frac{[\text{Print Density After Immersion}]}{[\text{Print Density Before Immersion}]} \times 100$$

The water resistance was evaluated on the basis of the following evaluation criteria:

(Evaluation Criteria)

○: Residual ratio being not less than 90%

Δ: Residual ratio being not less than 70% and less than 90%

X: Residual ratio being less than 70%

TABLE 2

|  | Kinds of Polyalkylene Oxide Derivatives | Print Density | Print Durability | Character Quality Blotting, etc. | Drop Directionality | Dry Resistance | Water Resistance |
|---|---|---|---|---|---|---|---|
| Ex. No. |  |  |  |  |  |  |  |
| 1 | Compound A | 1.45 | ⊚ | ○ | ○ | ○ | ○ |
| 2 | Compound B | 1.48 | ○ | ○ | ○ | ⊚ | ○ |
| 3 | Compound C | 1.43 | ○ | ○ | ○ | ○ | ○ |
| 4 | Compound D | 1.42 | ○ | ○ | ○ | ○ | ○ |
| 5 | Compound E | 1.42 | ○ | ○ | ○ | ○ | ○ |
| 6 | Compound F | 1.48 | ○ | ○ | ○ | ○ | ○ |
| 7 | Compound B | 1.41 | ○ | ○ | ○ | ○ | ○ |
| 8 | Compound B | 1.28 | ○ | ○ | ○ | ○ | ○ |
| Comp. Ex. No. |  |  |  |  |  |  |  |
| 1 | Polyethylene Glycol 1000 | 1.42 | Δ | ○ | x | Δ | ○ |
| 2 | Polyethylene Glycol Lauryl Ether | 1.15 | ○ | x | ○ | Δ | ○ |

It is clear from the results shown in Table 2 that the water-based inks obtained in Examples 1 to 8 simultaneously satisfy excellent print density, print durability, print character quality, dry resistance and water resistance, in comparison with those obtained in Comparative Examples 1 and 2.

Comparative Example 3

There were mixed together 4 parts by weight of C.I. Acid Red 52 (water-soluble dye), 5 parts by weight of glycerol, 10 parts by weight of diethylene glycol, 2 parts by weight of isopropyl alcohol and 79 parts by weight of ion-exchanged water, to give an ink.

The resulting ink was evaluated for water resistance. As a result, the evaluation was "X".

Having explained above, the water-based ink of the present invention is excellent in print density and print durability, and also has high print character quality, and is excellent in dry resistance and water resistance.

What is claimed is:

1. A water-based ink comprising (A) an aqueous dispersion of polymer particles having an average particle diameter of 20 to 200 nm, which particles contain a colorant, and (B) at least one polyalkylene oxide derivative selected from the group consisting of the compounds represented by the following formulae:

$$R^1O-(CH_2CH_2O)_a-H \quad (I)$$

$$H-(OCH_2CH_2)_b-O-R^2-O-(CH_2CH_2O)_c-H \quad (II)$$

$$R^3O-(CH_2CH_2O)_d-(CH_2CH(CH_3)O)_e-H \quad (III)$$

$$H-(OCH_2CH_2)_f-(OCH_2CH(CH_3))_g-O-R^4-O-$$
$$(CH_2CH(CH_3)O)_h-(CH_2CH_2O)_i-H \quad (IV)$$

wherein each of a and d is independently a number of 10 to 40; each of b and c is independently a number of 5 to 20; e is a number of 1 to 3; f is a number of 5 to 20; each of g and h is independently a number of 0 to 4, wherein g+h is a number satisfying 1 to 4; i is a number of 5 to 20; each of $R^1$ and $R^3$ is independently a monovalent aliphatic hydrocarbon group selected from the group consisting of ethyl, propyl, isopropyl, butyl, isobutyl, t-butyl, hexyl and isohexyl, a monovalent alicyclic group having 3 to 6 carbon atoms, or a monovalent aromatic group having 6 to 12 carbon atoms; $R^2$ is a divalent aliphatic group having 3 to 6 carbon atoms, a divalent alicyclic group having 3 to 6 carbon atoms, or a divalent aromatic group having 6 to 12 carbon atoms; $R^4$ is a divalent aliphatic group having 2 to 6 carbon atoms, a divalent alicyclic group having 3 to 6 carbon atoms, or a divalent aromatic group having 6 to 12 carbon atoms; and the oxyethylene chain and the oxypropylene chain described in the formulae (III) and (IV) may be added in random or block forms.

2. The water-based ink according to claim 1, wherein said colorant is a hydrophobic dye or a pigment.

3. The water-based ink according to claim 1, which comprises a water-soluble organic solvent.

4. The water-based ink according to claim 1, wherein the surface tension of the polyalkylene oxide derivative is at least 50 mN/m at 25° C.

5. The water-based ink according to claim 1, wherein each of $R^1$ and $R3$ is independently a monovalent alicyclic group having 3 to 6 carbon atoms or a monovalent aromatic group having 6 to 12 carbon atoms, $R^2$ is a divalent alicyclic group having 3 to 6 carbon atoms or a divalent aromatic group having 6 to 12 carbon atoms, and $R^4$ is a divalent alicyclic group having 3 to 6 carbon atoms or a divalent aromatic group having 6 to 12 carbon atoms.

6. The water-based ink according to claim 1, wherein said colorant is an organic pigment or carbon black.

7. In a water-based ink for inkjet recording, the improvement comprising producing increased jetting stability and drop directionality by including (A) an aqueous dispersion of polymer particles having an average particle diameter of 20 to 200 nm, which particles contain a colorant, and (B) at least one polyalkylene oxide derivative selected from the group consisting of the compounds represented by the following formulae:

$$R^1O-(CH_2CH_2O)_a-H \quad (I)$$

$$H-(OCH_2CH_2)_b-O-R^2-O-(CH_2CH_2O)_c-H \quad (II)$$

$$R^3O-(CH_2CH_2O)_d-(CH_2CH(CH_3)O)_e-H \quad (III)$$

$$H-(OCH_2CH_2)_f-(OCH_2CH(CH_3))_g-O-R^4-O-$$
$$(CH_2CH(CH_3)O)_h-(CH_2CH_2O)_i-H \quad (IV)$$

wherein each of a and d is independently a number of 10 to 40; each of b and c is independently a number of 5 to 20; e is a number of 1 to 3; f is a number of 5 to 20; each of g and h is independently a number of 0 to 4, wherein g+h is a number satisfying 1 to 4; i is a number of 5 to 20; each of $R^1$ and $R^3$ is independently a monovalent aliphatic hydrocarbon group selected from the group consisting of ethyl, propyl, isopropyl, butyl, isobutyl, t-butyl, hexyl and isohexyl, a monovalent alicyclic group having 3 to 6 carbon atoms, or a monovalent aromatic group having 6 to 12 carbon atoms; $R^2$ is a divalent aliphatic group having 3 to 6 carbon atoms, a divalent alicyclic group having 3 to 6 carbon atoms, or a divalent aromatic group having 6 to 12 carbon atoms; $R^4$ is a divalent aliphatic group having 2 to 6 carbon atoms, a divalent alicyclic group having 3 to 6 carbon atoms, or a divalent aromatic group having 6 to 12 carbon atoms; and the oxyethylene chain and the oxypropylene chain described in the formulae (III) and (IV) may be added in random or block forms.

8. The water-based ink according to claim 7, wherein said colorant is a hydrophobic dye or a pigment.

9. The water-based ink according to claim 7, which comprises a water-soluble organic solvent.

10. The water-based ink according to claim 7, wherein the surface tension of the polyalkylene oxide derivative is at least 50 mN/m at 25° C.

11. The water-based ink according to claim 7, wherein each of $R^1$ and $R^3$ is independently a monovalent alicyclic group having 3 to 6 carbon atoms or a monovalent aromatic group having 6 to 12 carbon atoms, $R^2$ is a divalent alicyclic group having 3 to 6 carbon atoms or a divalent aromatic group having 6 to 12 carbon atoms, and $R^4$ is a divalent alicyclic group having 3 to 6 carbon atoms or a divalent aromatic group having 6 to 12 carbon atoms.

12. The water-based ink according to claim 7, wherein said colorant is an organic pigment or carbon black.

* * * * *